United States Patent Office 2,882,764
Patented Apr. 21, 1959

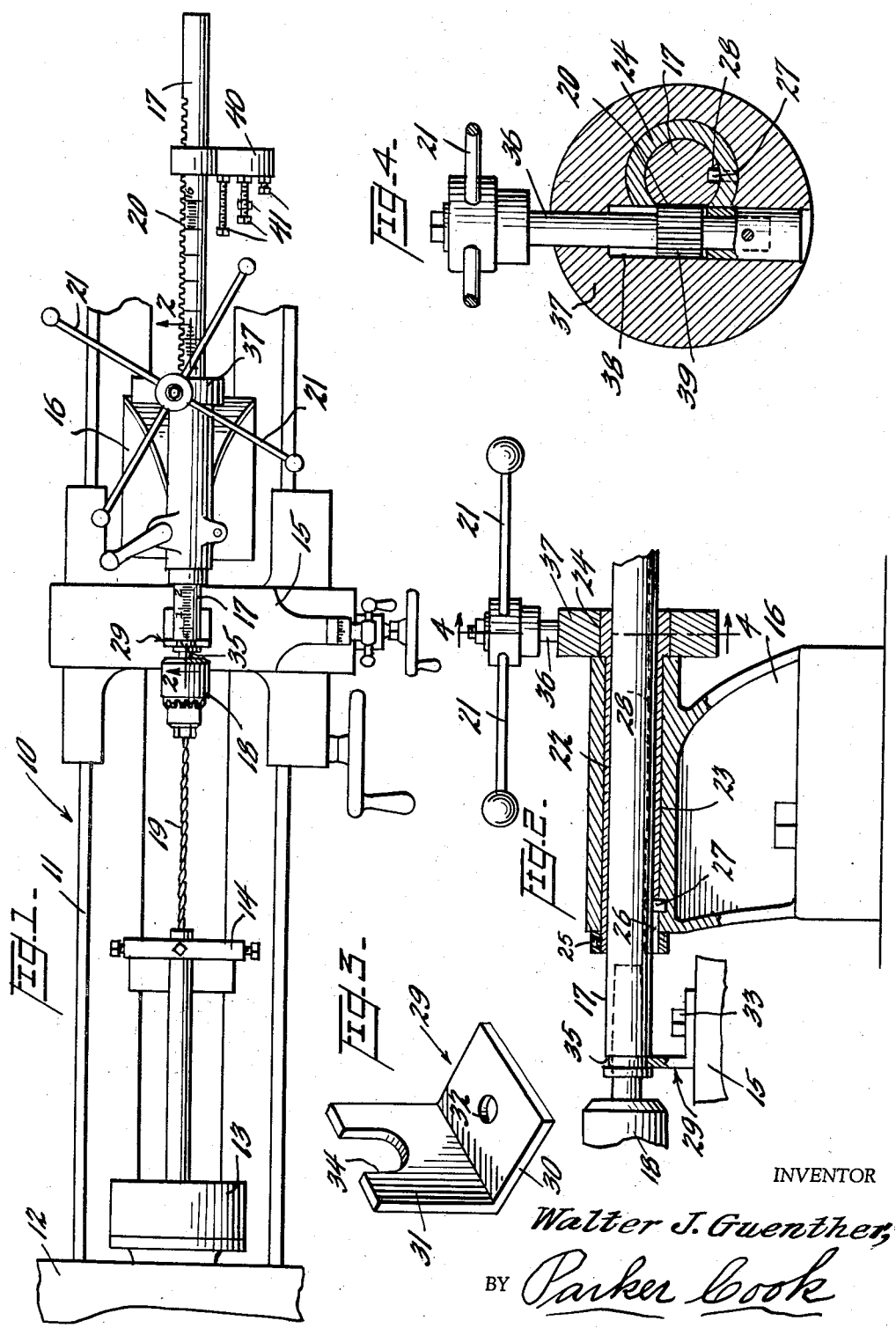

2,882,764

TAIL STOCK MECHANISM FOR ENGINE LATHES

Walter J. Guenther, Pleasantville, N.J., assignor to Mack Equipment and Machine Company, Atlantic City, N.J., a corporation of New Jersey Application March 25, 1958, Serial No. 723,867

4 Claims. (Cl. 77—60)

My invention relates to tail stock mechanism for engine lathes in which improved means are provided for moving the tail stock longitudinally along the bed of the lathe to facilitate longitudinal boring of stock being worked upon.

In accordance with one feature of the invention, a chuck is mounted at the forward end of a ram which is longitudinally slideable within a sleeve, the sleeve and the ram being keyed to the tail stock, and rack means are provided at the rear of the ram for engagement with a wheel-operated gear whereby the ram may be simply and efficiently mounted for longitudinal movement, whereby the ram may be projected or retracted by manual operation of the wheel. A feature of the invention is the fact that the ram may be longitudinally shifted a substantial distance to permit the drilling or reaming of long pieces of stock material without moving the tail stock.

The invention further includes the provision of means enabling interengagement of the forward end of the ram with the conventional tool holder, whereby the tool holder may be caused to longitudinally traverse the bed by means of power-operated equipment conventionally present for this purpose and thereby carry the ram forward, whereby manual operation may be supplemented, when desired, by power operation.

My invention will now be more fully described in conjunction with the accomptnying drawings in which:

Fig. 1 is a plan view of an illustrative engine lathe constructed in accordance with the invention;

Fig. 2 is a partial sectional view of the tail stock, showing the longitudinally movable ram, the mounting of the ram in the tail stock and the manual means for reciprocating the ram longitudinally of the tail stock. There is further shown the interconnection which may be effected between the tool holder and the forward end of the ram to permit power operation of the ram;

Fig. 3 is an enlarged perspective view illustrating a preferred bracket which may be employed to interconnect the forward end of the ram with the tool holder; and Fig. 4 is a cross-section taken on the line 4—4 of Fig. 2 and illustrating the interconnection between the manually operated gear and the rack which is formed on the rear of the longitudinally movable ram.

Referring more particularly to Fig. 1, the numeral 10 generically designates an engine lathe comprising a bed 11, a head stock 12, a chuck 13, a steady rest 14, a tool holder 15 and a tail stock 16. The tail stock 16 includes a longitudinally movable ram 17 which carries, at its forward end, a chuck or other tool holding device of conventional construction indicated by the numeral 18. A center drill 19 is shown mounted in the forward end of the tool bit 18. As will be evident, the drill 19 may be replaced by a tap or reamer, etc. It will further be seen that a piece of stock is mounted in the chuck 13, the stock being retained in position by the steady rest 14. As is pictured in Fig. 1, the ram 17 is to be moved forwardly (to the left) whereby the drill 19 is moved into and through the stock so that, upon rotation of the headstock 12, a hole will be drilled by the drill 19 longitudinally through the stock.

The rear portion of the ram 17 is formed with a rack 20, the rack 20 being intended to be employed to effect longitudinal reciprocation of the ram 17 upon manual operation of the hand-spoke wheel 21. The manner in which the wheel 21 effects longitudinal movement of the ram 17 is more clearly shown in Fig. 4 which will be described hereinafter.

Referring to Fig. 2, it will be seen that the ram 17 is slidably mounted within a sleeve 22 which, in turn, is positioned within the longitudinal bore 23 drilled through the tail stock 16.

The trailing end of the sleeve 22 is of increased diameter, as indicated at 24, whereby the sleeve 22 is locked to the tail stock so that the sleeve can not be moved forwardly through the bore 23. The forward end of the sleeve 22 is threaded and securing means such as the nut 25 is employed to prevent the sleeve 22 from being withdrawn through the bore 23 except when desired.

The forward end of the sleeve 22 is slotted, as indicated at 26, and a key 27 projects from the tail stock 16 inwardly into the bore 23. The ram 17 is longitudinally grooved, as indicated at 28, and the key 27 extends through the slot 26 and also into the groove 28 whereby both the sleeve 22 and the ram 17 are prevented from rotating.

It will be understood that the drilling of bore 23 to precise tolerances represents a difficult and expensive operation. In accordance with the invention, the bore 23 may be roughly drilled and precise tolerance with respect to the shaft 17 achieved through the sleeve 22.

Referring to Figs. 1 and 2, the tool holder 15 is of conventional construction, and, in accordance with conventional practice, there is provided means for engaging the tool holder 15 with means for driving the tool holder longitudinally along the bed 11. Normally, power operated gearing is available beneath the bed 11 to which the tool holder 15 may be engaged to cause the tool holder 15 to move longitudinally along the bed 11. Structure for performing the tool holder driving operation is old and well known in the art and is not illustrated in the drawings.

In accordance with the present invention, a bracket 29 is mounted over a portion of the tool holder 15, the bracket 29 conveniently comprising a base leg 30 and an upstanding leg 31. The base leg 30 is formed with an opening 32 therein for the purpose of releasably securing the bracket 29 to the tool holder 15 as by means of the nut 33 shown in Fig. 2. The upstanding leg 31 defines an upper semi-circular recess 34, the purpose of which will be apparent hereinafter.

As will be seen in Figs. 1 and 2, and particularly in the latter, the forward end of the ram 17 is formed with a circumferential channel 35. The upstanding leg 31 of the bracket 29 (recess 34) is formed to engage the circumferential channel 35, the leg 31 engaging the walls of the channel 35 as illustrated.

As will now be apparent, when the tool holder 15 is moved longitudinally of the bed 11, the bracket 29 will interengage with the forward end of the ram 17 so that the ram will be moved longitudinally together with the tool holder 15, thereby permitting the power operated equipment forming part of the conventional engine lathe to be employed for the longitudinal boring of stock in the manner depicted in Fig. 1.

Manual operation in accordance with the present invention is most clearly shown in Fig. 4, where it will be seen that operation of the wheel 21 effects rotation of shaft 36 which is mounted for rotation within the casing 37 about an axis transverse to the direction of movement of the ram 17.

Mounted along the length of the shaft 36 and more particularly being positioned within the enlarged bore 38 is a gear 39 which meshes with the rack 20 on the ram 17. Thus, when the wheel 21 is operated, rotation of the shaft 36 is transmitted to the gear 39 whereby the teeth of gear 39 may engage with the teeth of rack 20 to translate rotation of wheel 21 into longitudinal movement of the ram 17. As will be appreciated, when the tool holder 15 is employed to provide a power movement for the ram 17, the rack 20 will engage the gear 39 and the wheel 21 will rotate freely, permitting movement of the ram 17. On the other hand, when the ram 17 is not connected to the tool holder 15 by means of the bracket 29, then the tool holder is free to perform its normal function and the handle 21 may be operated to longitudinally move (project or retract) the ram 17 as desired.

As will be appreciated, the provision of rack 20 at the rear of the ram 17 provides the opportunity for longitudinally moving the ram over a long distance, e.g., a distance of about 16 or more inches, so that stock of considerable length may be drilled in a single operation and without it being necessary to free, move and then resecure the tail stock 16 as is normally required in conventionally available equipment. Further, this same lengthy traverse of the ram 17 may be obtained using the bracket 29 and the power traverse equipment which is normally available for moving the tool holder 15.

At the rear of the ram 17 and positioned at any desired point along the length thereof is a member 40 carrying stops 41. As will be evident, when the selected stop 41 abuts the housing 37, the ram 17 stopped to thereby limit insertion of drill 19 into the stock being worked upon.

The invention is defined in the claims which follow.

I claim:

1. In an engine lathe comprising a tail stock having a longitudinally movable ram, a tool holder and power means for causing said tool holder to longitudinally traverse the bed of said engine lathe, the improvement which comprises bracket means releasably secured to said tool holder, said bracket means having an upstanding leg portion interengaged with said ram whereby the power movement of said tool holder may be employed to carry said ram.

2. An engine lathe as recited in claim 1 in which said bracket comprises a base leg, means to releasably secure said base leg to said tool holder and said upstanding leg being carried by said leg.

3. An engine lathe as recited in claim 2 in which said ram is formed with a circumferential channel at the forward end thereof and said upstanding leg of said bracket defines a semi-circular recess which fits within said channel.

4. An engine lathe comprising a tail stock having a longitudinally movable ram, a tool holder and a power means for causing said tool holder to longitudinally traverse the bed of said engine lathe, a bore extending longitudinally through said tail stock, key means extending from said tail stock into the interior of said bore, a sleeve having a slot therein secured within said bore, said key means extending through said slot to prevent rotation of said sleeve, a ram extending through said sleeve, said ram having a longitudinal groove therein, said key means extending into said groove whereby said ram is free to move longitudinally through said sleeve but is prevented from rotating, wheel operated means carrying a shaft mounted for rotation on an axis transverse to the direction of movement of said ram, gear means on said shaft, rack means on the rear of said ram, said gear means meshing with said rack means whereby rotation of said wheel will longitudinally move said ram, bracket means comprising a base leg and an upstanding leg, means to releasably secure said base leg to said tool holder, a circumferential channel at the forward end of said ram, and said upstanding leg of said bracket defining a recess which fits within said channel whereby said ram may be longitudinally movable by either manual operation of said wheel means or by power operation of said tool holder.

References Cited in the file of this patent

UNITED STATES PATENTS

| | | |
|---|---|---|
| 2,507,155 | Gruen et al. | May 9, 1950 |
| 2,614,447 | Lomazzo | Oct. 21, 1952 |
| 2,776,590 | Korienek | Jan. 8, 1957 |